United States Patent [19]

Clayton et al.

[11] Patent Number: 4,876,056
[45] Date of Patent: Oct. 24, 1989

[54] FLOW MEASUREMENT

[75] Inventors: Colin G. Clayton, Tregaron; Ramon Spackman, Didcot, both of United Kingdom

[73] Assignee: United Kingdom Atomic Energy Authority, London, England

[21] Appl. No.: 117,831

[22] Filed: Nov. 9, 1987

[30] Foreign Application Priority Data

Nov. 24, 1986 [GB] United Kingdom ............ 8628055

[51] Int. Cl.$^4$ .................... G21G 1/06; G21H 5/00
[52] U.S. Cl. .................... 376/152; 250/303; 250/437
[58] Field of Search ............ 376/159; 250/303, 432 R, 250/434, 436, 437

[56] References Cited

U.S. PATENT DOCUMENTS

| | | | |
|---|---|---|---|
| 2,826,700 | 3/1958 | Hull | 250/303 |
| 2,841,713 | 7/1958 | Howard | 376/159 |
| 2,968,721 | 1/1961 | Shapiro et al. | 250/303 |
| 3,115,576 | 12/1963 | Rickard | 250/303 |
| 3,602,712 | 8/1971 | Mann et al. | 250/437 |
| 3,723,732 | 3/1973 | Larson et al. | 376/159 |
| 3,823,316 | 7/1974 | Boswell | 376/159 |
| 4,233,508 | 11/1980 | Arnold | 376/159 |
| 4,293,379 | 10/1981 | Kelly et al. | 376/159 |
| 4,338,520 | 7/1982 | Stewart | 376/159 |

FOREIGN PATENT DOCUMENTS 862891 3/1961 United Kingdom .
2036957 7/1980 United Kingdom .

OTHER PUBLICATIONS

Nucleonics, Apr. 1955, pp. 18–21, Hull (II).

Primary Examiner—Harvey E. Behrend
Attorney, Agent, or Firm—William R. Hinds

[57] ABSTRACT

A method and an apparatus are provided for measuring the flow rate of a fluid in a duct, for example in an under-sea crude oil pipeline, in which samples of a radioactive tracer are injected, at intervals, into the duct and the passage of the samples of tracer detected by a scintillator. The tracer is generated by irradiating a large volume of a liquid obtained from the environment of the duct with a neutron source, so that the sample has been irradiated for a prolonged period prior to injection.

2 Claims, 1 Drawing Sheet

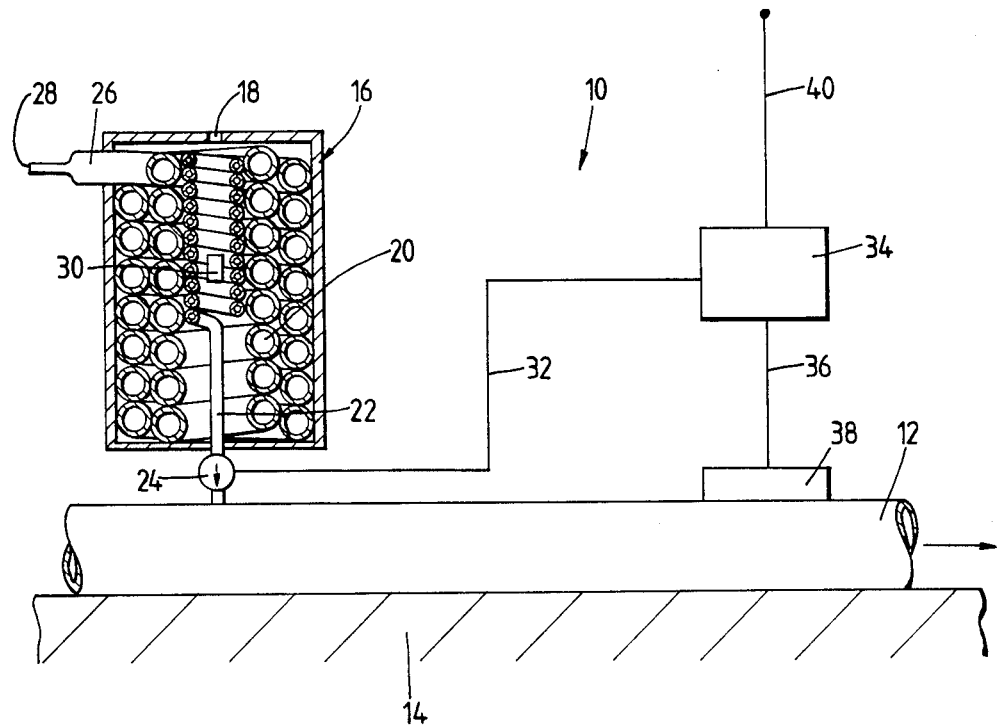

FLOW MEASUREMENT

This invention relates to a method and an apparatus for measuring the flow of a fluid in a duct, and particularly though not exclusively for measuring the flow of liquid in a sub-sea pipeline.

According to the present invention there is provided a method for measuring the flow of a fluid in a duct having at least a length thereof immersed in a saline sea, the method comprising locating a container adjacent to the duct, with the container having an inlet communicating with the sea to allow ingress, as a test fluid, of sea water from the sea, causing the test fluid to enter the container, storing the test fluid in the container, irradiating the test fluid in the container with neutrons so as to generate atoms of a predetermined radioactive nuclide in the test fluid, injecting at spaced time intervals a sample of the irradiated test fluid from the container into the duct, detecting, at a location spaced apart along the duct from the location at which the injection takes place, radiation emitted by the predetermined radioactive atoms, and determining, from the elapsed time between the injection of the test fluid and the detection of the radiation, the flow rate of the fluid.

An advantage accruing from use of sea water as a test fluid obtained from the environment of the duct is that the apparatus can operate for a long period of time without any need for servicing; the period of operation is not limited by the storage capacity of the container. It is therefore suited to use in remote or hostile locations such as on the sea bed.

The invention is especially suited to measuring flow in under-sea pipelines carrying oil, for example from an oil well. Sea water typically contains sodium ions at a concentration of about 10 g/liter. As a consequence of neutron irradiation, sodium-24 nuclides are created. These decay with emission of beta and gamma radiation and with a half-life of 14.8 hours.

The invention will now be further described, by way of example only, and with reference to the accompanying drawing which shows a diagrammatic view, partly in section, of a flow measuring apparatus 10, arranged to measure the flow in a crude oil pipeline 12 lying on the sea bed 14. The apparatus 10 is entirely surrounded by and immersed in sea water.

The apparatus 10 includes an irradiation chamber 16, cylindrical in shape, made of steel coated with an anticorrosion plastic coating, and with a small vent hole 18 in its top. The chamber 16 encloses a copper tube 20 wound into a number of helically wound layers; the portion of the tube 20 forming the innermost layer is of narrower diameter than the remainder of the tube 20. An end portion 22 of the tube 20 extends from the innermost layer of the winding out of the base of the chamber 16 and is connected via a constant volume, high pressure, injection pump 24 to the bore of the pipeline 12. The other end portion 26 of the tube 20 projects from the chamber 16, tapering to a narrower diameter, and being open at its end 28. Since the apparatus 10 is immersed in sea water, sea water fills the chamber 16 and the entire length of the tube 20; the volume of sea water in the tube 20 is about 50 liters. At the centre of the irradiation chamber 16 is a 100 microgram californium-252 neutron source 30 providing $2.3 \times 10^8$ neutrons/sec. These are moderated by the sea water so the sea water in the tube 20 is subjected to irradiation by thermal neutrons. At a distance of 40 mm from the source 30 the flux is about $10^6$ thermal neutrons per $cm^2$ per second.

The pump 24 is connected by a power supply cable 32 to a microprocessor unit 34. The unit 34 is connected by a cable 36 to a sodium iodide scintillator 38 mounted on the wall of the pipeline 12 at a distance in the flow direction from the point at which the injection pump 24 is connected to the pipeline 12 such that the oil/water in the pipeline 12 takes about 10 seconds to travel that distance. The scintillator 38 itself is of such a length that the oil/water in the pipeline 12 flows past it in about a tenth of a second. The unit 34 is also connected by a power-supply and data transmission cable 40 to a power source (not shown) which may be remote from the apparatus 10.

In operation of the apparatus 10 the sea water filling the tube 20 is constantly irradiated by thermal neutrons from the source 30, so that sodium-24 nuclides are generated from the sodium naturally present in the sea water. Once every fifteen minutes the pump 24 is energised to inject 50 milliliters of this irradiated sea water into the pipeline 12. After about ten seconds this injected sample of sea water will pass the scintillator 38 which detects the gamma radiation emitted as a result of the decay of the sodium-24 nuclides. From the time interval between energising the pump 24 and the detection of the gamma rays by the scintillator 38, the flow velocity of the contents of the pipeline 12 are calculated by the microprocessor 34, this data being transmitted along the cable 40.

Since the end 28 of the tube 20 is open, the tube 20 remains full of sea water at all times, and the sea water flows along the tube 20 slowly (at a rate corresponding to 50 ml per 15 minutes) taking just over ten days to flow the length of the tube 20. The long helical winding and the narrow end portion 26 minimise diffusion of irradiated sea water back out of the open end 28.

Assuming for simplicity that the neutron flux is uniform throughout the length of the tube 20, and considering a small volume of the sea water in the tube 20 which at a time t includes $N_S$ stable atoms and $N_R$ radioactive atoms (whose sum is $N_T$). Then:

$$dN_R = FN_S dt - cN_R dt$$

where F is a constnt depending on the neutron flux and the cross-section for production of the radioactive nuclei, and where c is the decay constant for the radioactive nuclei. Consequently, after irradiation of the sea water for a time $t_r$:

$$N_R = (FN_T/c)(1 - e^{-ct_r})$$

is the number of radioactive atoms present. (This assumes that only a small proportion of the atoms present become radioactive).

This small volume of seawater is then injected into the pipeline 12, and passes along the pipeline 12 past the scintillator 38. If the transit time taken for it to reach the scintillator 38 is $t_t$, and the time during which gamma rays from the irradiated sea water are counted is $t_c$, then the number of gamma rays detected will be:

$$n = (KFN_T/c)(1 - e^{-ct_c})e^{-ct_t}(1 - e^{-ct_r})$$

where K is a constant. Since in practice the counting time will be much shorter than the transit time and the irradiation time, and will be much less than the half-life of the radioactive nuclei (i.e. since $ct_c$ is much less than one) this can be written as:

$$n = KFN_T t_c e^{-ct_t}(1 - e^{-ct_r})$$

It is evident that the number of gamma rays detected depends in general upon the decay constant c. For any given values of irradiation time and transit time there is an optimum value of c which gives the largest number of detected gamma rays. This corresponds to an optimum half-life T lying between the values of the transit time and the irradiation time, and given by:

$$T = t_r \log 2/\log((t_r + t_t)/t_t)$$

For example in the apparatus 10 the sample of sea water is irradiated for ten days before injection, and the transit time is about 10 seconds. For these values, the optimum half-life of the radioactive nuclei is:

$$T = 52\ 700\ \text{sec} = 14.6\ \text{hours}$$

This is close to the half-life of sodium-24, which is 14.8 hours.

However, as long as the irradiation time is several half-lives, then the equilibrium concentration of the radioactive nuclide will be achieved; and as long as the transit time is a small fraction of the half-life, then the activity will not significantly decrease during transit. Thus the values of the irradiation time, half-life, and transit time are not critical. Under such circumstances the decay constant c does not affect the number of gamma rays detected, which is given by:

$$n = KFN_T t_c$$

and hence the factors which determine the number of gamma rays detected are the parameters F, relating to the neutron flux to which the test fluid is subjected, and to the cross-section for the activation reaction, and $N_T$ relating to the concentration in the test fluid of the nuclides which can undergo the activation reaction, and to the volume of the injected sample. In the present case, the cross-section of sodium is 0.54 barns; and as mentioned earlier the concentration of sodium ions typically 10 g/liter.

If any other gamma-emitting nuclides are also generated (for example a chlorine isotope) this will increase the number of gamma rays detected. It will be appreciated that the dimensions of the tube 20 may differ from those described, as too may the volume of the injected sample. The injected volume is chosen to ensure that passage of the injected sample can be reliably sensed by the scintillator 38, i.e. that sufficient gamma counts are received; and that the gamma counts received form a sharp peak, i.e. that the injected test fluid occupies only a short length within the pipeline 12. In the apparatus 10 it will be appreciated that the detected gamma count can be increased by increasing the injected volume of test fluid; although this reduces the irradiation time, and hence the activity of the test fluid, this is more than made up for by the increased volume. However the injected volume must be small in comparison with the volume per unit length of the pipeline 12, and the time taken for the injection must be short in comparison with the transit time.

We claim:

1. A method for measuring the flow of a fluid in a duct having at least a length thereof immersed in a saline sea, the method comprising locating a container adjacent to said duct with said container having an inlet communicating with said sea to allow ingress, as a test fluid, of sea water from said sea, causing said test fluid to enter said container, storing said test fluid in said container, irradiating said test fluid in said container with neutrons so as to generate atoms of a predetermined radioactive nuclide in said test fluid, injecting at spaced time intervals a sample of the irradiated test fluid from said container into said duct, detecting, at a location spaced apart along said duct from the location at which the injection takes place, radiation emitted by said predetermined radioactive atoms, and determining, from the elapsed time between the injection of the test fluid and the detection of the radiation, the flow rate of the fluid.

2. A method as claimed in claim 1 wherein said test fluid is irradiated for a time more than the half-life of said predetermined radioactive nuclide, and the location at which detection is performed is at such a separation from the location at which the injection takes place that the elapsed time is less than the half-life of said predetermined radioactive nuclide.

* * * * *